(12) United States Patent
Hollberg

(10) Patent No.: US 7,591,007 B2
(45) Date of Patent: Sep. 15, 2009

(54) COMPUTER NETWORK AND METHODS FOR GRANTING AND REVOKING ACCESS PRIVILEGES FOR AN INFORMATION SOURCE

(75) Inventor: Ulf Hollberg, Wiesloch (DE)

(73) Assignee: International Business Machines Corporation, Armonk, NY (US)

(*) Notice: Subject to any disclaimer, the term of this patent is extended or adjusted under 35 U.S.C. 154(b) by 881 days.

(21) Appl. No.: 11/201,020

(22) Filed: Aug. 9, 2005

(65) Prior Publication Data

US 2006/0037068 A1 Feb. 16, 2006

(30) Foreign Application Priority Data

Aug. 12, 2004 (EP) .................................. 04103885

(51) Int. Cl.
*G06F 21/00* (2006.01)
(52) U.S. Cl. ........................................................ 726/7
(58) Field of Classification Search ...................... 726/7; 713/158, 166
See application file for complete search history.

(56) References Cited

U.S. PATENT DOCUMENTS 7,058,971 B1 * 6/2006 Horikiri ........................ 726/7

* cited by examiner

*Primary Examiner*—Gilberto Barron, Jr.
*Assistant Examiner*—Devin Almeida
(74) *Attorney, Agent, or Firm*—George R. McGuire; Bond, Schoeneck & King, PLLC

(57) ABSTRACT

A computer network and methods are provided for granting and revoking access privileges for an information source of the computer network. The computer network also comprises an Access Control List (ACL) for the information source, listing authorized users of the information source together with their access privileges, and means for generating a reference to the information source. The computer network is characterized by means for adding access privileges to the reference and means for passing the resulting enhanced reference to another user of the network and, thus, providing the receiving user with the access privileges passed. Furthermore, the computer network comprises means for automatically generating a Reference Passing Tree (RPT) for the information source by automatically storing the identification of the user sending the enhanced reference, the identification of the user receiving the enhanced reference and the access privileges provided by the enhanced reference. Moreover, the computer network comprises means for "cupping" the RPT, thus, automatically revoking at least parts of a user's access privileges, which have been provided directly or indirectly by another user, when the parts of the other user's access privileges are revoked.

5 Claims, 4 Drawing Sheets

COMPUTER NETWORK AND METHODS FOR GRANTING AND REVOKING ACCESS PRIVILEGES FOR AN INFORMATION SOURCE

FIELD OF THE INVENTION

The present invention relates to a computer network comprising at least one information source, an Access Control List (ACL) for said information source, listing authorized users of said information source together with their access privileges, and means for generating a reference to said information source. The present invention also relates to methods for granting and revoking access privileges for information sources in such computer networks.

BACKGROUND OF THE INVENTION

Networked Lotus Notes (LN) environments are an example of a computer network as described above, which is well known in the art. Usually, such LN environments comprise LN databases to store and maintain information and make it accessible to other LN users. In terms of the present invention these LN databases represent information sources. They are identified by their unique location on a home server and an unique name. Each LN user is identified by a name, e.g. "Hugo Strong/Germany/IBM", and an internal ID structure.

An LN user can only access an LN database if he knows the identity of said database and if he is authorized to access said database. Therefore he has to be listed in an Access Control List (ACL) of said database. As further entries beside the identity of the authorized users the ACL comprises an access mode for each authorized user representing his access privileges. There are several different access modes, as e.g. "Editor", "read and write" or "read only". Thus, it is possible to distinguish between e.g. authors and readers of the database documents. Granting, restricting or revoking access privileges can only be carried out by modifying the ACL. This editing has to be done manually by specially authorized master administrators, like e.g. an LN user with access mode "manager".

A very common and comfortable way to communicate an LN database to other LN users is sending a reference to said LN database in an LN mail. According to the state of the art, the receiver of such a reference can only access the corresponding LN database directly if he is listed in the corresponding ACL with appropriate access privileges.

This mechanism of passing references and accessing the corresponding information sources involves several problems. As every LN user can pass the reference of an LN database to another LN user the number of LN users knowing said LN database is likely to grow constantly. Not even a master administrator being responsible for the ACL of said LN database will be able to name all "knowing" LN users because communication of a reference transfer is not required. As the granting of access rights is independent of a reference transfer and can only be done on request by specially authorized master administrators it is often tedious to use a referenced information source. In practice, Restriction and revocation of access rights is even harder to achieve because this has to be done manually, too. Thus, the ACLs tend to grow constantly or, at least, to be longer than appropriate, causing a potential for unintentional access permission.

OBJECTS AND SUMMARY OF THE INVENTION

Starting from this, the object of the present invention is to simplify the access to information sources in a computer network by better controlling the community of authorized users.

The foregoing object is achieved by a computer network and methods as laid out in the independent claims. Further advantageous embodiments of the present invention are described in the dependent claims and are taught in the following description.

According to the present invention a computer network comprising means for generating a reference to an information source is characterized by means for adding access privileges to said reference and by means for passing the resulting enhanced reference to another user of the network and, thus, providing said user with the access privileges passed. Further, said computer network comprises means for automatically generating a Reference Passing Tree (RPT) for said information source by automatically storing the identification of the user sending said enhanced reference, the identification of the user receiving said enhanced reference and the access privileges provided by said enhanced reference. Furthermore, said computer network comprises means for "cupping" said RPT, thus, automatically revoking at least parts of a user's access privileges, which have been provided directly or indirectly by another user, when said parts of said other user's access privileges are revoked.

Besides, the present invention provides a method for granting access privileges for an information source in a computer network with at least one information source, comprising the steps of generating a reference to said information source and adding access privileges to said reference, passing the resulting enhanced reference to another user of the network and, thus, providing said receiving user with the access privileges passed, and automatically generating a Reference Passing Tree (RPT) for said information source by automatically storing the identification of the user sending said enhanced reference, the identification of the user receiving said enhanced reference and the access privileges provided by said enhanced reference.

Finally, the present invention provides a method for revoking access privileges for an information source in a computer network, comprising the steps of revoking at least parts of a user's access privileges, and "cupping" said RPT generated for said user, thus, automatically revoking the same parts of all users' access privileges, which have been provided directly or indirectly by said user.

In other words, the core idea of the present invention is to allow each user of a computer network to grant access rights for an information source of said computer network by combining a reference to said information source with appropriate access rights and passing the resultant enhanced reference to another user of the computer network. This facility reduces the work of a master administrator significantly and relieves him from error prone manual granting and maintenance of access rights. Besides, obtaining of access rights becomes very easy. To control the community of authorized users the present invention provides a mechanism to keep track of passed references by recording the sending and the receiving user together with the respective access rights in an RPT indicating the passing history. An authorized master administrator can inspect the granted access rights at any time by visiting this RPT. He is also allowed to modify the RPT to restrict or revoke a user's access rights. According to the present invention, revocation of a user's access rights will remove the subtree of passed references directly or indirectly initiated by said user. Thus, the present invention provides an effective method for reasonable restriction of access rights in a single operation taking into account the passing history of a reference or rather the added access rights.

Of course, there are many different ways to implement a computer network and the methods claimed, e.g. depending on the particular application of the invention.

In most cases it is reasonable to restrict the extent of the access privileges passed to another user to the extent of the access privileges of the passing user. Then, only authorized users can pass an enhanced reference with at most the full scope of their own access privileges. E.g., a user with "read and write"-access privileges may pass "read and write"- or "read only"-access privileges but is not allowed to pass "change title"-access privileges. Thus, the misuse of access privileges can be restricted effectively.

In an advantageous embodiment of the present invention, which is very comfortable to use, the system provides automatically default access privileges to pass when generating a reference to an information source. The scope of these default access privileges may depend e.g. on the information source. So, in some cases it may be appropriate to pass the full scope of the sending user's access privileges by default while in other cases the default access privileges may be restricted to a minimum, as "read only".

In addition or as alternative to providing default access privileges, the system may offer a dialogue to the user to determine the access privileges to be added to a reference. E.g. this dialogue may inform the user about the extent of his own access privileges concerning the information source in question and may propose several valid access privilege options for choice.

Usually, all users of a computer network, who are authorized to access an information source of said computer network, are listed in an Access Control List (ACL) of said information source. For reasons of better processing it is advantageous to merge the information of the RPT and the information of said ACL to obtain one updated list or array comprising all authorized users together with their access privileges and passing history. This enhanced ACL may be stored on a remote server although it is often advantageous to store the ACL and/or the RPT on the home server of the corresponding information source.

BRIEF DESCRIPTION OF THE DRAWINGS

The invention itself, however, as well as a preferred mode of use, further objectives, and advantages thereof, will best be understood by reference to the following detailed description of an illustrative embodiment when read in conjunction with the accompanying drawings, wherein.

DETAILED DESCRIPTION OF THE PREFERRED EMBODIMENT

Figure 1:
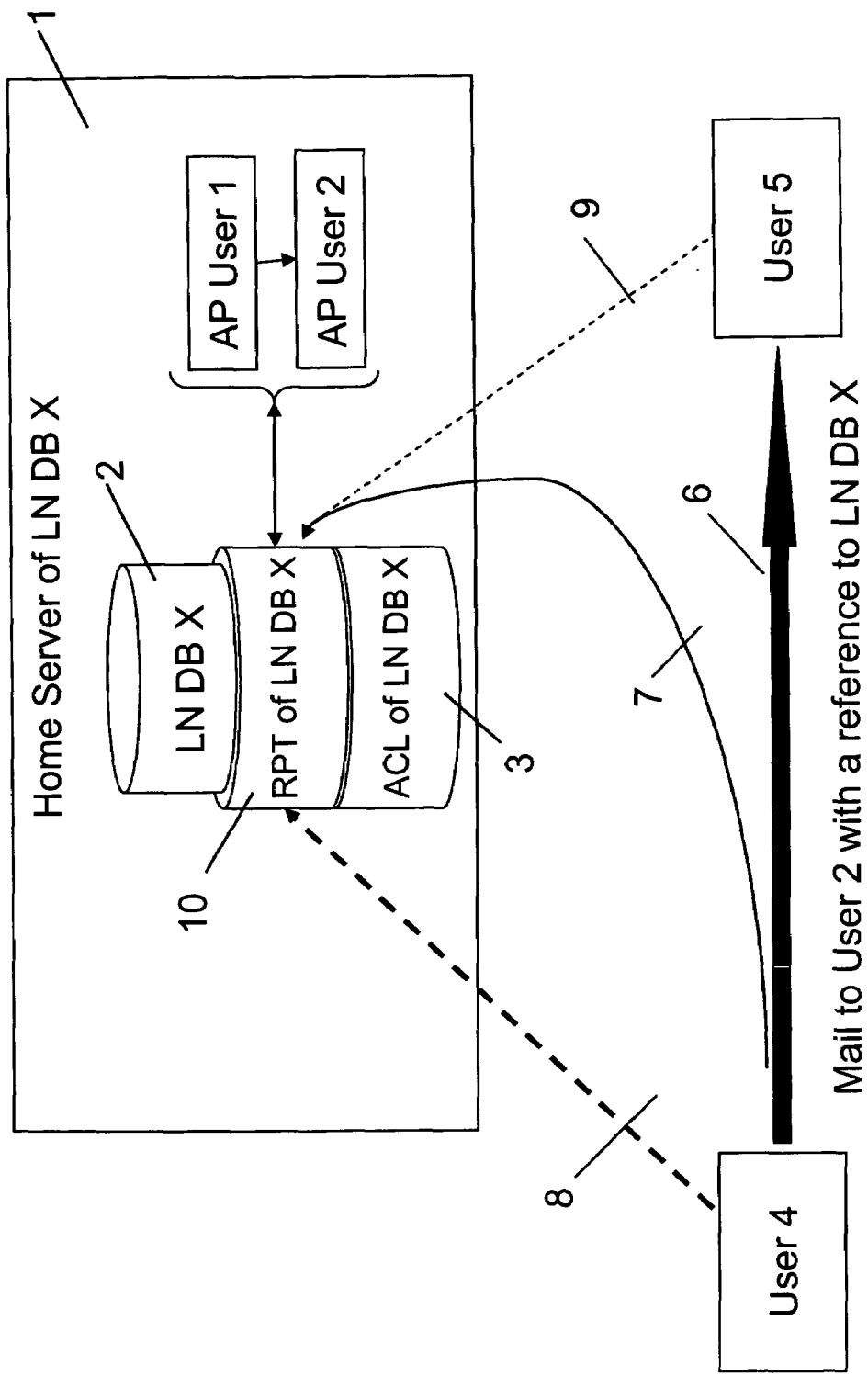
FIG. 1 shows a block diagram illustrating the granting of access rights for an LN database by passing an enhanced reference to said database.

The block diagram of FIG. 1 shows at least parts of a networked Lotus Notes (LN) environment comprising a database (DB) X being located on a home server 1. DB X represents an information source 2 in terms of the present invention. Also stored on home server 1 is an Access Control List (ACL) 3 for said information source 2, listing authorized users of DB X together with their access privileges.

A first user 4 of said LN environment is passing a mail to a second user 5 what is indicated by arrow 6. This mail includes a reference to DB X. A reference to an LN database, as DB X, is a special object, which can be created by the LN function "copy as link" and put into LN documents and LN mail by the "paste" function. Sending such a reference is part of the common processing for LN documents.

For the purpose of this invention, this mechanism of passing a reference is extended by adding access privileges to the reference and passing them together with said reference as enhanced reference. The only precondition is that the sending user has to be authorized to access the referenced database. Consequently, any authorized user is able to grant access rights by passing an enhanced reference to another user. In the here described example the sending user 4 is authorized to access DB X. His access privileges are indicated by the dotted arrow 8. So, he is able to enhance the reference to DB X with access privileges to authorize the receiving user 5 to access DB X, too. Here, misuse of granting access privileges is restricted in that it is not allowed to grant access privileges exceeding the own access privileges. The access privileges granted by user 4 are indicated by the dotted arrow 9.

According to the invention the mechanism of passing a reference is further extended by transferring the so-called passing information to the home server 1 of DB X. This passing information is indicated by arrow 7 and comprises the identification of the sending user, the identification of the receiving user and the access privileges passed together with the reference. To prevent theft and faking of access privileges it is the sending user who transfers the passing information to the home server when passing the enhanced reference to another user. The reasoning behind this transfer is twofold. On the one hand, all transfers of references to a given LN database are recorded what is the base for the simplified but controlled authorization according to the invention. On the other hand, the validity of access privileges to be granted by reference can be checked and granting can be blocked if necessary. This is important to effectively prevent the unauthorized passing of access privileges.

Figure 2:
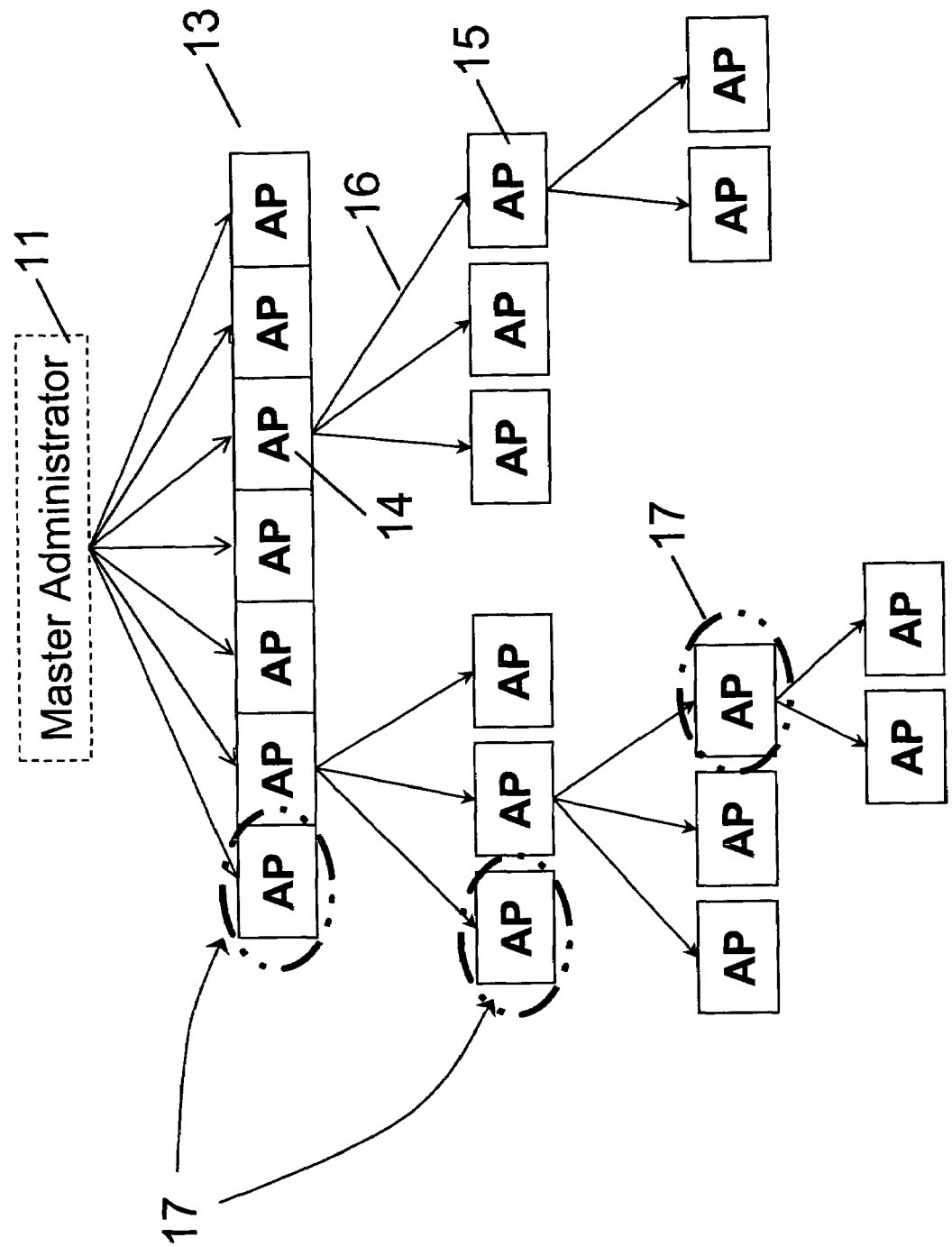
FIG. 2 shows a diagram of an Access Control List together with a Reference Passing Tree generated according to the present invention.

At the home server 1 of DB X the passing information is used for automatically generating or developing a Reference Passing Tree (RPT) 10 for DB X, as depicted in FIG. 2. The first row 13 of RPT 10 corresponds to ACL 3 of DB X, listing authorized users together with their access privileges AP which have been granted by a master administrator 11. This granting operation is indicated by arrows. The sending user 4 is listed in the ACL 3 and consequently in row 13 together with his AP 14. The passing information generated in the example of FIG. 1 is recorded as entry into the RPT 10 below the sending user, what means below AP 14, as arrow 16 to AP 15. This arrow 16 represents the passing of the enhanced reference to the receiving user 5 and AP 15 are the access privileges granted therewith.

When receiving passing information, the home server 1 checks whether the sending user is allowed to pass the corresponding reference and access privileges. If not, no further entry is added to the RPT 10. The security policy of the operator of the LN environment defines further processing in this case, e.g. whether the reference is passed from the sending user to the receiving user without access privileges for later explicit manual authorization by the master administrator.

FIG. 2 makes clear that, when receiving the enhanced reference, user 5 is not only authorized to access DB X but can also grant corresponding access privileges to other users.

According to the invention, the master administrator 11 is not only authorized to manipulate the ACL 3 for initial granting, restricting or revoking of access privileges. The master administrator is as well authorized to modify the APs in each level of the RPT 10. In the here described example, the encircled APs 17 in the different levels of the RPT 10 are modified directly by the master administrator 11.

Figure 3:
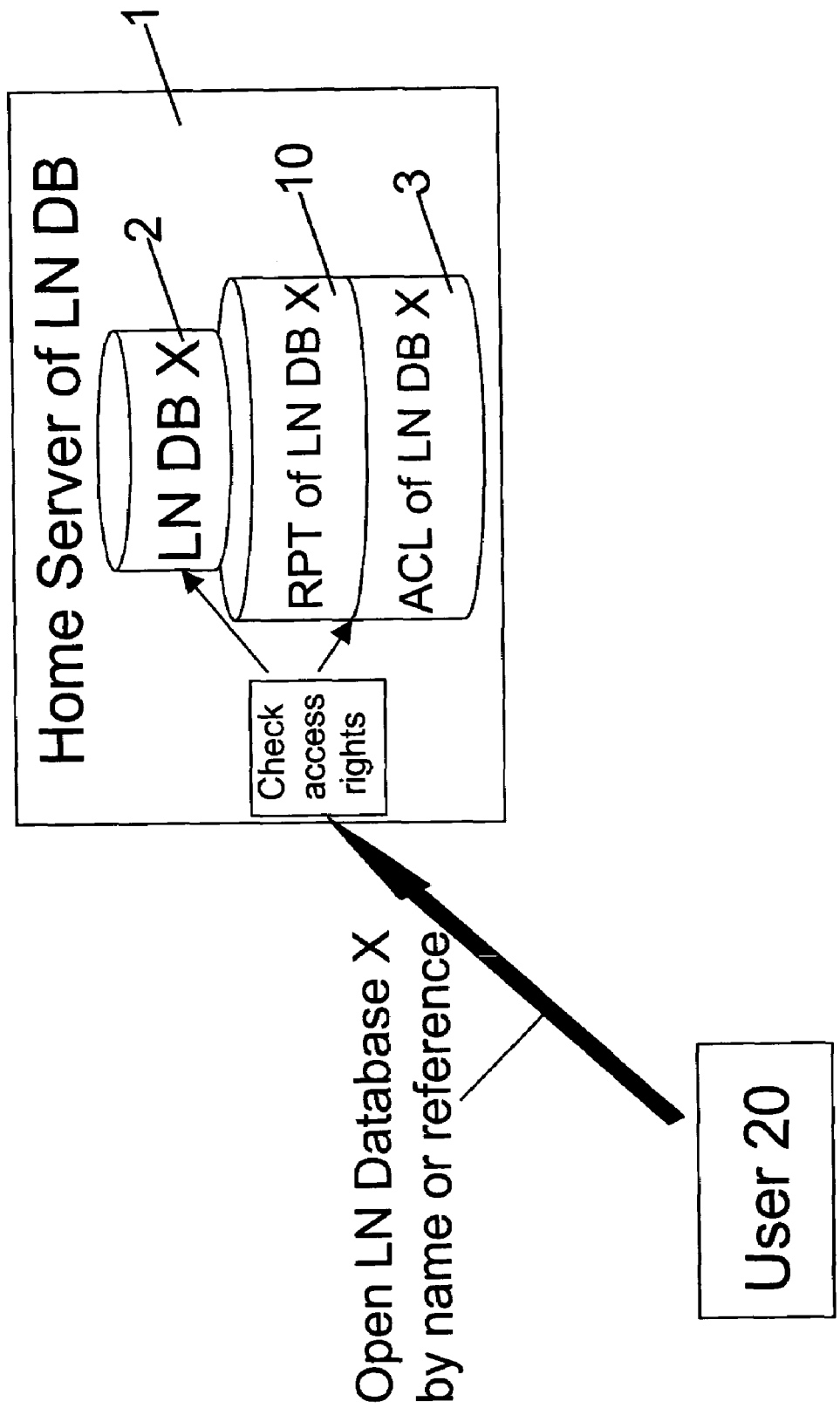
FIG. 3 shows a block diagram illustrating the access to an LN database in a networked LN environment according to the present invention.

FIG. 3 illustrates the different possibilities for an LN user 20 to access an information source 2, like DB X, of the networked LN environment described in connection with FIGS. 1 and 2. The user 20 can attempt to access DB X by directly opening it via its home server and its name. Such an attempt will be successful if the user 20 has an entry in the ACL 3 and/or the RPT 10 of DB X. For that reason, said ACL 3 is scanned to verify the user's authorization as well as the RPT 10.

Having received a reference to DB X, user 20 can also attempt to access DB X directly via said reference. Like in the case before, the home server 1 of DB X verifies the authorization of user 20 by scanning the ACL 3 as well as the RPT 10 of DB X. The verification is positive if the user 20 is listed at least once, either in the ACL or in the RPT. This means that the verification process is extended according to the invention.

It should be mentioned here, that the process of scanning the ACL and the RPT of an information source can be optimized by creating appropriate data structures in parallel to the RPT, like an enhanced list or array. It should be noted here that a given LN user can appear several times in the ACL and in the RPT.

Replication of LN databases is one of the strongest features of LN. It allows to copy the contents of LN databases in a fashion that the structure of the original remains the same and that any modification of the copy can be reapplied onto the original. Thus, the process of replication is generally two-way. Replication improves the speed of accessing an LN database in larger networks and more importantly, allows for operation in temporarily fragmented networks.

Replication and fragmentation opens a new dimension for access control. The current LN product copies the ACLs as part of the replication process. This feature together with the local encryption of LN database replica solves the problem. But, updates to the ACL done at the home server will need network connectivity and a replication run before they can have an impact on the LN users trying to access the replica. This effect can not be avoided and will also be acceptable for the extended scope access privileges introduced by the invention.

Figure 4:
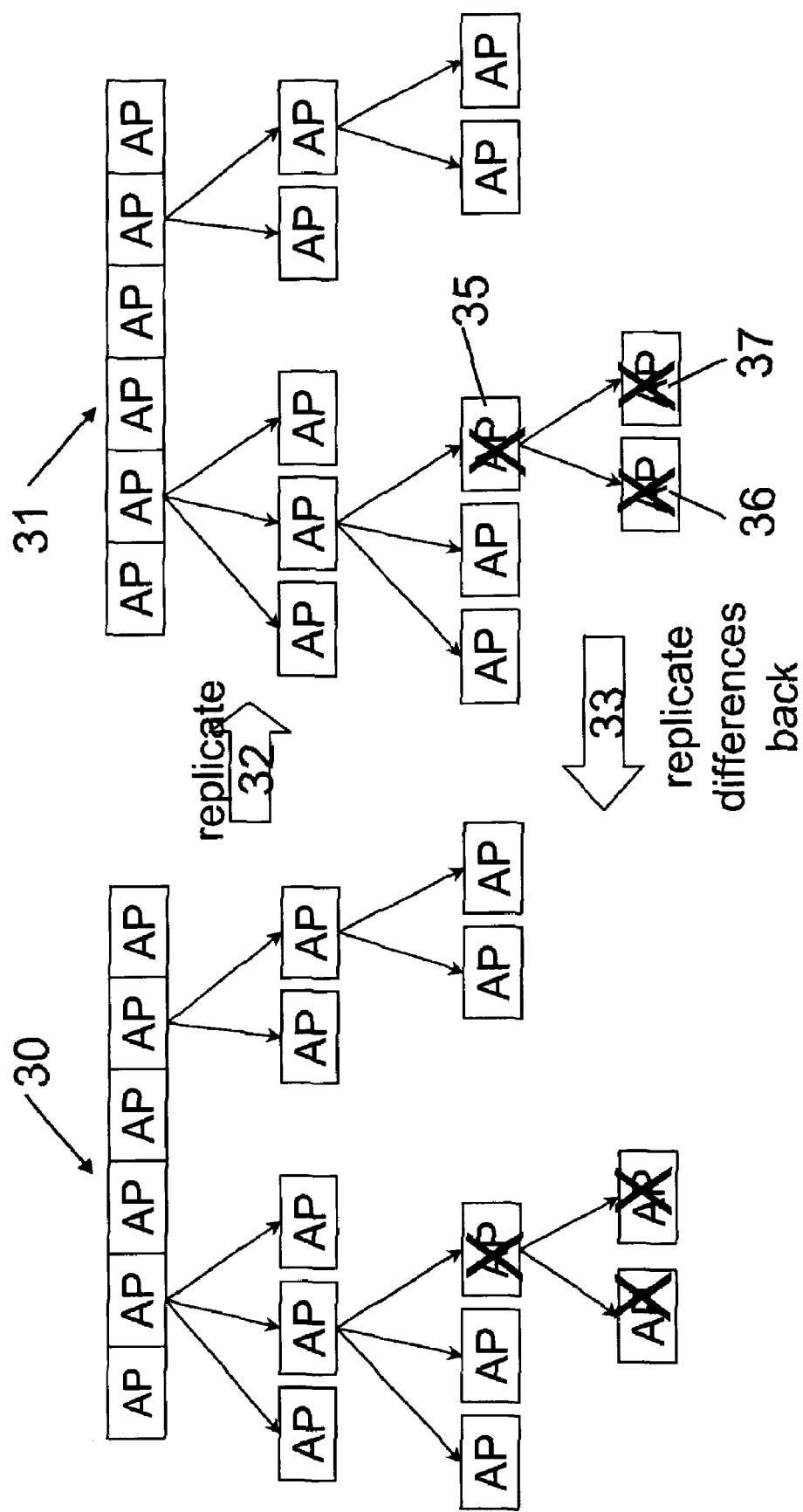
FIG. 4 shows another diagram of an Access Control List together with a Reference Passing Tree illustrating modification and replication of the ACL and RPT.

FIG. 4 illustrates the consequences of replication for the mechanism of granting, restricting and revoking access privileges for an information source according to the invention. The left hand side of FIG. 4 shows an original RPT 30 stored on the home server of the corresponding LN database. The structure of RPT 30 is similar to RPT 10 described in connection with FIG. 2. The right hand side of FIG. 4 shows a replica 31 of RPT 30 which has been generated together with a replica of the corresponding LN database. This replication process is indicated by arrow 32. RPT 30 and its replica 31 have identical structures.

In the presence of network fragmentation the passing of an enhanced reference to an LN database with a reachable replica is recorded in the RPT of this replica. In the same way, any master administrator of the original RPT can modify the RPT of the replica. In the example illustrated in FIG. 4 a master administrator has revoked an user's access privileges AP 35 in the replica RPT 31, what is indicated by crossing AP 35. According to the invention, all access privileges, which have been granted directly or indirectly by said user are then automatically revoked, too, which means the replica RPT 31 is cupped at AP 35. In the here described example AP 36 and AP 37 of two further users are revoked automatically, which is indicated by crossing AP 36 and AP 37 in the replica RPT 31.

During a later replication run, indicated by arrow 33, the information of replica RPT 31 and original RPT 30 are merged at the home server of the corresponding LN database to update the original RPT 30 which is then copied into the replica RPT 31. Thus, the revocation of AP 35, AP 36 and AP 37 is recorded in the original RPT 30. As consequence, in case of network fragmentation, LN users may gain or loose access to the original of an LN database as late as a replication has successfully been completed.

Finally it should be mentioned, that the present invention can be realized in hardware, software, or a combination of hardware and software. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation;

b) reproduction in a different material form.

What is claimed is:

1. A computer network comprising:

a computer server device comprising at least one information source;

an Access Control List (ACL) for said information source, listing authorized users of said information source together with their access privileges; and means for generating a reference to said information source;

means for adding access privileges to said reference;

means for passing the resulting enhanced reference to another user of the network and, thus, providing said with the access privileges passed;

means for automatically generating a Reference Passing Tree (RPT) for said information source by automatically storing the identification of a user sending said enhanced reference in a storage device, the identification of the another user receiving said enhanced reference and the access privileges provided by said enhanced reference; and means for "cupping" said RPT, thus, automatically revoking at least parts of the another user's access privileges, which have been provided directly or indirectly by said user, when said parts of said user's access privileges are revoked.

2. The computer network according to claim 1, further comprising means for restricting the extent of the access privileges passed to the another user to the extent of the access privileges of said user.

3. The computer network according to claim 1, further comprising means for automatically adding default access privileges to a reference when generating said reference.

4. The computer network according to claim 1, further comprising means for supporting by dialogue the determination of access privileges to be passed together with a reference.

5. The computer network according to claim 1, further comprising means for merging the information of said RPT and the information of said ACL to obtain an updated enhanced ALC.

* * * * *

UNITED STATES PATENT AND TRADEMARK OFFICE
CERTIFICATE OF CORRECTION

PATENT NO. : 7,591,007 B2
APPLICATION NO. : 11/201020
DATED : September 15, 2009
INVENTOR(S) : Ulf Hollberg Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1070 days.

Signed and Sealed this

Twenty-first Day of September, 2010

David J. Kappos
*Director of the United States Patent and Trademark Office*